United States Patent [19]

Haan

[11] 4,256,419
[45] Mar. 17, 1981

[54] ENDPLATE STOP FOR SILAGE DISTRIBUTOR

[76] Inventor: John R. Haan, R.R. #1, Box 95B, Mulberry, Ind. 46058

[21] Appl. No.: 103,456

[22] Filed: Dec. 14, 1979

[51] Int. Cl.³ .............................................. B65G 53/52
[52] U.S. Cl. .................................................... 406/161
[58] Field of Search ................ 414/293; 198/641, 640; 406/159, 160, 161; 56/13.3, 13.4, 71, 203

[56] References Cited

U.S. PATENT DOCUMENTS

| | | | |
|---|---|---|---|
| 2,650,136 | 8/1953 | Raleigh | 406/159 |
| 3,321,252 | 5/1967 | Dreier | 406/161 |
| 3,834,768 | 9/1974 | Stoltefos et al. | 406/160 |
| 3,883,010 | 5/1975 | Heslop | 406/161 |

Primary Examiner—Robert B. Reeves
Assistant Examiner—Gene A. Church
Attorney, Agent, or Firm—Woodard, Weikart, Emhardt & Naughton

[57] ABSTRACT

In a silage distributor assembly of the type in which a spreader plate, in the path of silage issuing from the discharge end of a fill tube, has hinged to its outer, free margin a curved deflector plate, there is disclosed a stop member which prevents the kinetic energy of the material moving out of the fill tube from lifting the curved plate to a raised position yet permits the plate to be freely moved to its raised position by means of a cable extending to the base of the silo.

4 Claims, 4 Drawing Figures 4,256,419

ENDPLATE STOP FOR SILAGE DISTRIBUTOR

BACKGROUND OF THE INVENTION

It is known in the prior art related to silage distributors to utilize a spreader plate, usually having depending, diverging vanes on its underside, which is hinged to a gooseneck fill tube. U.S. Pat. Nos. 3,834,768 and 3,321,252 disclose this general construction. Conventionally, the free end of the spreader plate has hinged to it a curved or arcuate-in-profile deflector plate. At selected intervals, during a silo filling cycle, the deflector plate is in a raised position and in a lowered position the remainder of the silo filling operation. Since the curved deflector plate, in lowered position, directly intersects the flow of silage off the tip of the spreader plate, it is subjected to the substantial kinetic energy of the moving silage and a considerable force tending to pivot the deflector plate upward into its raised position is exerted on the plate. The tendency, modernly, to use higher capacity blowers to propel the silage accentuates this undesired lifting of the deflector plate. Biasing springs opposing this lifting action have been only partially successful because of the wide variation in specific gravity of the materials which the silo filling operation must accomodate. Since the deflector plate must be intentionally moved to its raised position during a portion of the fill cycle, this actuation being preferably performed at a remote location (at the base of the silo), a simple manual locking of the deflector plate in lowered position will not solve the problem.

The concept of the present invention envisages a positive stop abutment for an element moved rectilinearly when the deflector plate is subjected to the kinetic energy of the moving silage, thereby preventing the plate from moving to raised position under this impetus, the element being angularly moved to clear the stop abutment when the deflector plate is moved to raised position by means of a flexible cable extending to the silo base. Thus, the required manual, remote raising of the deflector plate is unimpeded but a positive stop is provided which prevents the flow of silage, impinging on the deflector plate, from raising the plate.

DESCRIPTION OF THE PREFERRED EMBODIMENT

Figure 1:
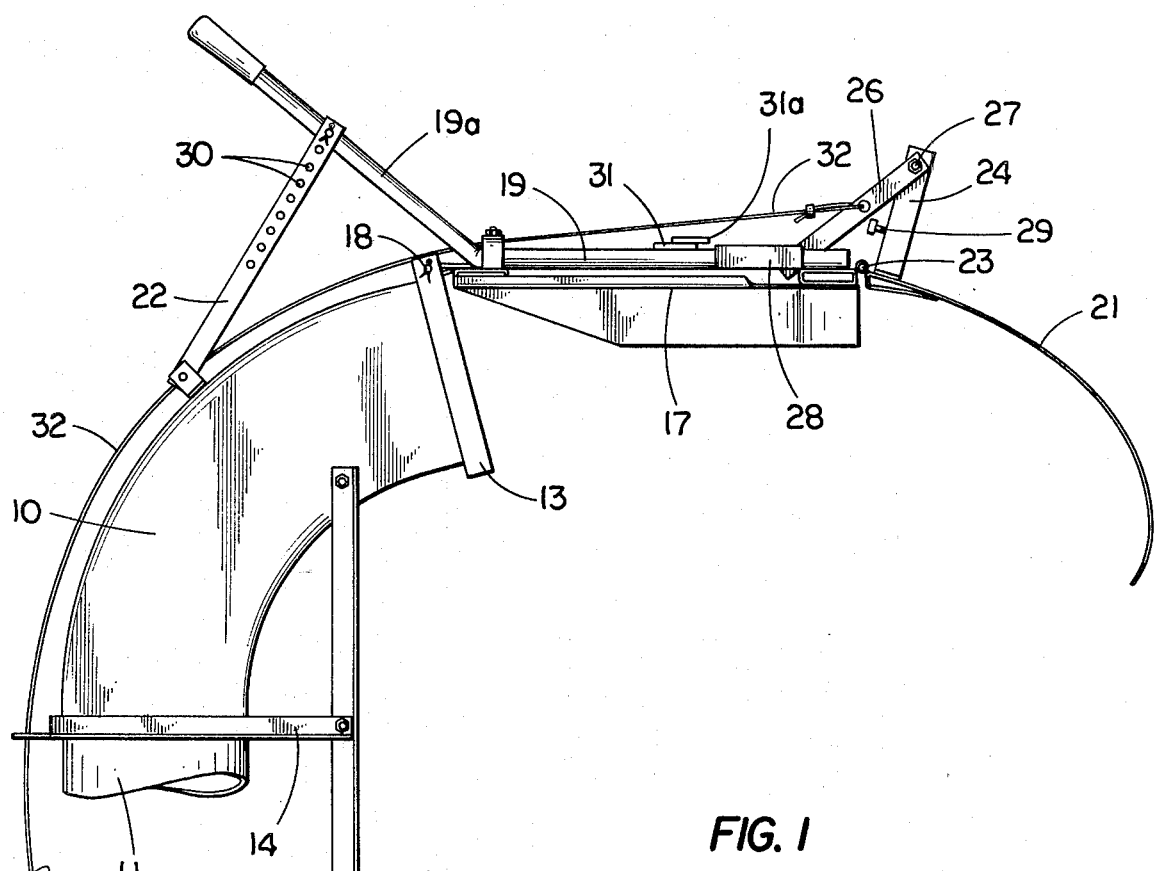
FIG. 1 is a side view of an apparatus embodying the present invention.
Figure 2:
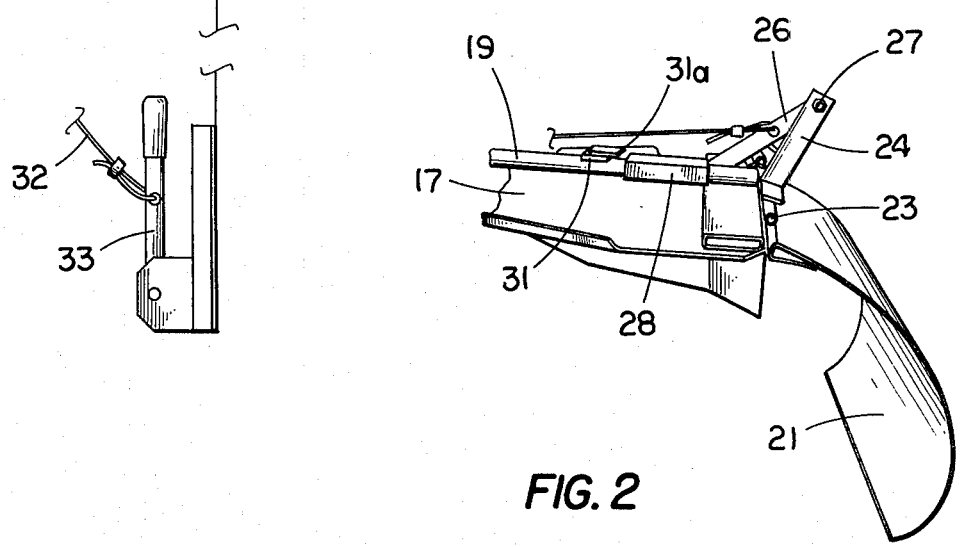
FIG. 2 is a perspective view of a portion of the apparatus of FIG. 1.

Referring initially to FIG. 1, a silage distributor assembly embodying the present invention may be seen to include a gooseneck fill tube 10 which receives silage or other material through a fill tube 11 which extends vertically along the exterior face of a silo (not shown), the discharge end of the fill tube extending at least to the margin of the silo.

The fill tube 10 is mounted by any suitable means such as support members 14 and 16 to the upper end of the silo. The spreader plate 17 is hinged, at pintle 18, to the frame 13 and the adjusted position of spreader plate 17 is determined by the extension portion 19a of the guide member 19 cooperating with a pin inserted in the chosen one of alternate apertures 30 in upwardly extending member 22. The hinged connection at 18 of the plate 17 and the fill tube form no part of the present invention, however, the sidewardly adjustable positioning of the plate 17 on the hinge pintle 18 is disclosed in detail and claimed in copending U.S. Pat. application Ser. No. 104,012 filed 12/17/79 and assigned to the Assignee of the present invention.

Specifically, the present invention is embodied in the means for actuating the deflector plate 21 which is hinged to the tip of the vaned deflector plate 17. The plate 21 is hinged, by means of hinge pintle 23, to the reinforced margin or tip of spreader plate 17 and a first lever arm 24 is rigidly secured to the convex, upper surface of plate 21 and extends upwardly therefrom. A second lever arm 26 is pivotally attached at one of its ends to the arm 24 by means of pivot pin 27. The opposite end of arm 26 has welded to it an inverted channel member 28 which receives, and slides freely over, the guide rod 19 rigidly secured to plate 17 and previously mentioned with respect to its extending portion 19a. An adjustably positioned, headed member 29 extends from lever 24 and engages the lever 26 defining the maximum lowered position of curved plate 21.

Welded or otherwise rigidly secured to guide rod 19 is a stop abutment 31 having a portion 31a extending forwardly at an elevation just above the upper surface of the web portion of channel member 28 so that, when the end of member 28 engages the stop abutment, the portion 31a will closely overlie the member 28 preventing its displacement above the stop 31 by random vibration of the assembly.

An actuating member, taking the form of a flexible cable 32 is attached to lever 26 intermediate its ends. As may be best seen in FIG. 1, the cable passes through suitable guiding eyelets to the exterior of the silo (not shown) and is connected at the exterior of the silo base to a suitable lever or winch 33. The arrangement permits plate 21 to be remotely actuated for movement between lowered position (FIG. 1) and raised position (FIG. 4) at selected intervals in the silo loading cycle, every other load increment for example, to insure proper deposit of the silage, or other material in the silo.

Figure 4:
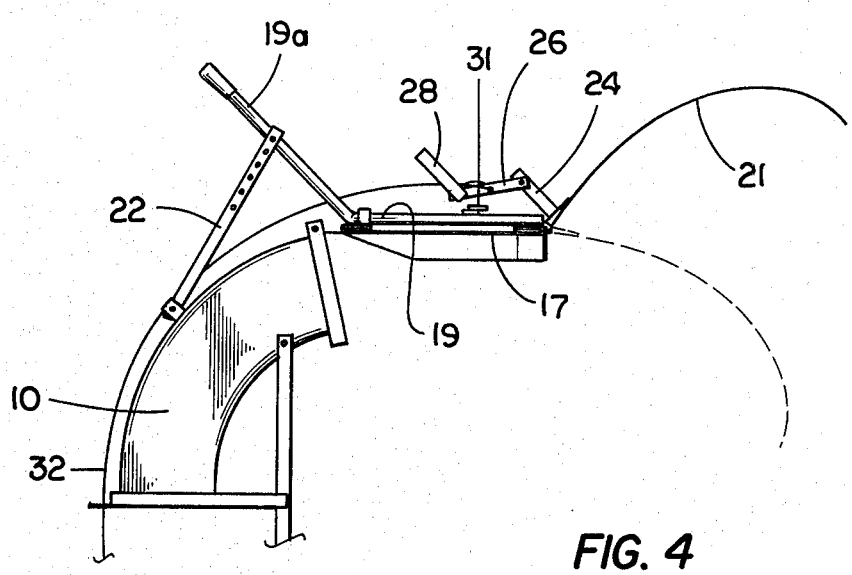
FIG. 4 is a schematic side view of the apparatus shown in FIG. 3 but illustrating the deflector plate in raised position.

In operation, when the plate 21 is to be remotely moved from the lowered position of FIG. 1 to the raised position of FIG. 4 by tensioning cable 32, the initial movement of lever 26 will be clockwise (as viewed in FIG. 1) pivotal movement about pin 27. Since the angle between channel member 28 and lever 26 is fixed, the channel member will, consequently, be moved upwardly, in an arcuate path, so as to clear the stop abutment 31. Further tensioning of cable 32 causes levers 24 and 26 to move to their extended positions of FIG. 4 in which plate 21 is in full raised position. It will be noted that the action of the components is such that stop 31 does not interfere with the raising of plate by tensioning of cable 32.

Figure 3:
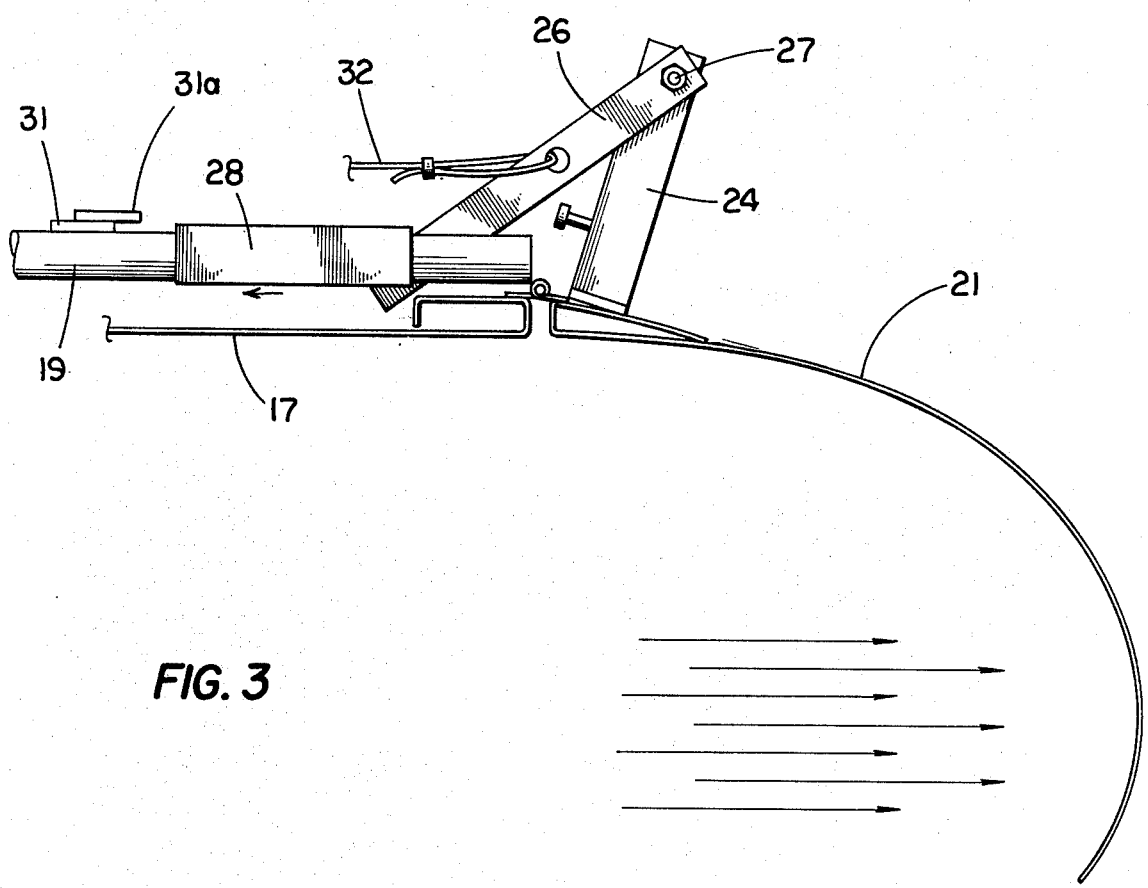
FIG. 3 is an enlarged side view of the apparatus shown in FIG. 2 illustrating the impingement of silage on the deflector plate.

As previously mentioned, the function of stop abutment 31 is to resist undesired raising of plate 21 by the force exerted by the kinetic energy of the moving stream of silage as it impinges on plate 21. This condition is depicted in FIG. 3. Assuming cable 32 is not tensioned, excessive kinetic energy of the silage stream (indicated by arrows in FIG. 3) will tend to swing plate 21 counterclockwise (as viewed in FIG. 3) about its pivot 23. Initial motion of plate 21 under this impetus, however, will cause channel member 28 to move in a rectilinear path, defined by guide rod 19, and indicated by an arrow in FIG. 3, until it engages stop 31 and, when so engaged, will be held against random vibrational disengagement by the overlying stop portion 31a. It will be noted that since cable 32 is untensioned, upward pressure on plate 21 does not produce a lifting, or motion in an arcuate path, of the member 32 but, instead, produces rectilinear motion of the channel member 32 causing it to promptly engage the positive stop 31. Subsequently, when the flow of silage decreases or is shut off, the components retreat, by gravity, to their positions of FIG. 3 in which the channel member position permits the cable 32 to raise plate 21 if that should be desired.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In a silage distributor assembly adapted to deposit silage or the like within a silo, said assembly being of the type having a gooseneck fill tube and a spreader plate extending into the silo interior and having a curved deflector plate hinged to the free end of the spreader plate for cooperation therewith in distributing silage issuing from the fill tubee, wherein the improvement comprises an actuating member providing remote movement of the deflector plate about its hinge between a raised position in which the deflector plate is substantially out of the silage flow path and a lowered position in which it directly intersects the silage flow path, a linkage assembly interconnecting said deflector plate and said actuating member, said linkage assembly including an element moveable in a rectilinear path when the kinetic energy of the silage flow moves said deflector plate toward its raised position and moveable in an arcuate path as the deflector plate is moved to its raised position by said actuating member, and a stationary stop abutment engaged by said element as it moves in its rectilinear path to limit the movement of the deflector plate by the kinetic energy of the silage flow, said element clearing said stop abutment as it moves in its arcuate path when said deflector plate is moved to its raised position by said actuating means.

2. A silage distributor assembly as claimed in claim 1 in which said actuating member comprises a cable which extends to the exterior base of the silo.

3. A silage distributor assembly as claimed in claim 2 in which said linkage includes a first lever rigidly secured to the convex surface of said deflector plate and extending upwardly therefrom, a second lever pivotally attached at one end to said first lever and carrying said element at its other end, said element taking the form of an inverted channel member, a guide rod secured to said spreader plate carrying said stop abutment and receiving said inverted channel member and defining its rectilinear motion path, said cable being attached to said second lever intermediate the ends of said second lever.

4. A silage distributor assembly as claimed in claim 3 in which said stop abutment includes an abutment portion overlying said channel member when the stop abutment is engaged by the channel member to thereby prevent disengagement thereof by random vibration of the assembly.

* * * * *